T. J. WHEELER.
MACHINE FOR GATHERING INSECTS.
APPLICATION FILED JUNE 29, 1911.
1,016,861.
Patented Feb. 6, 1912.
2 SHEETS—SHEET 2.
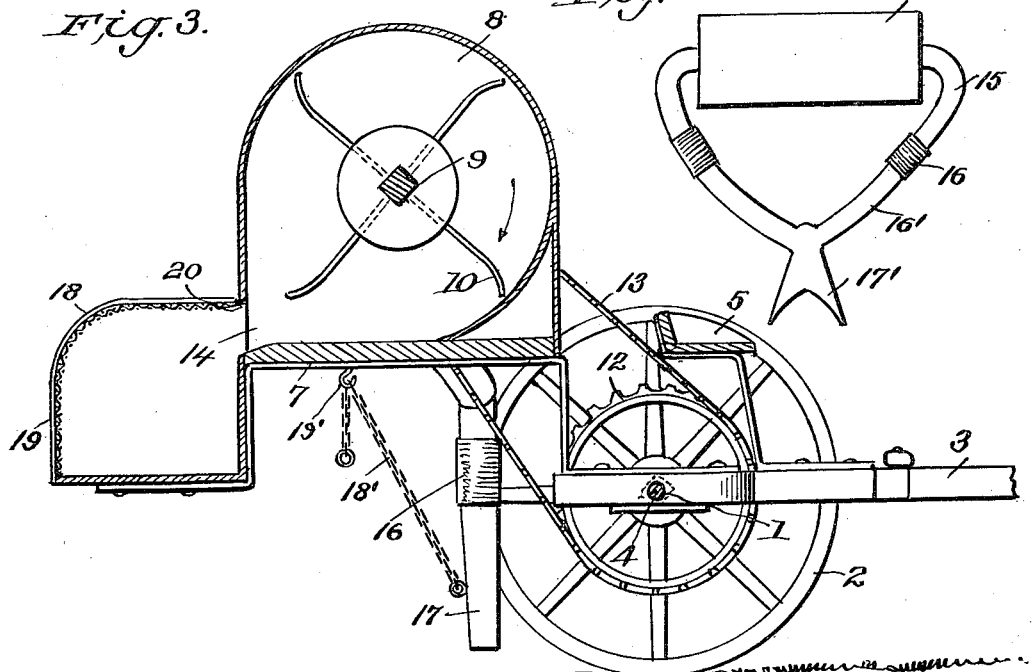
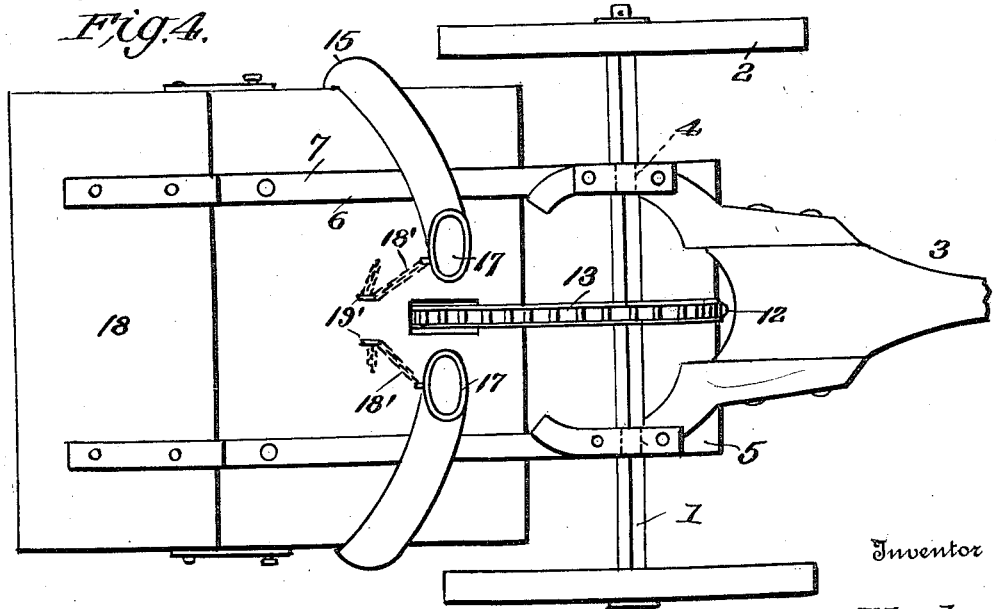

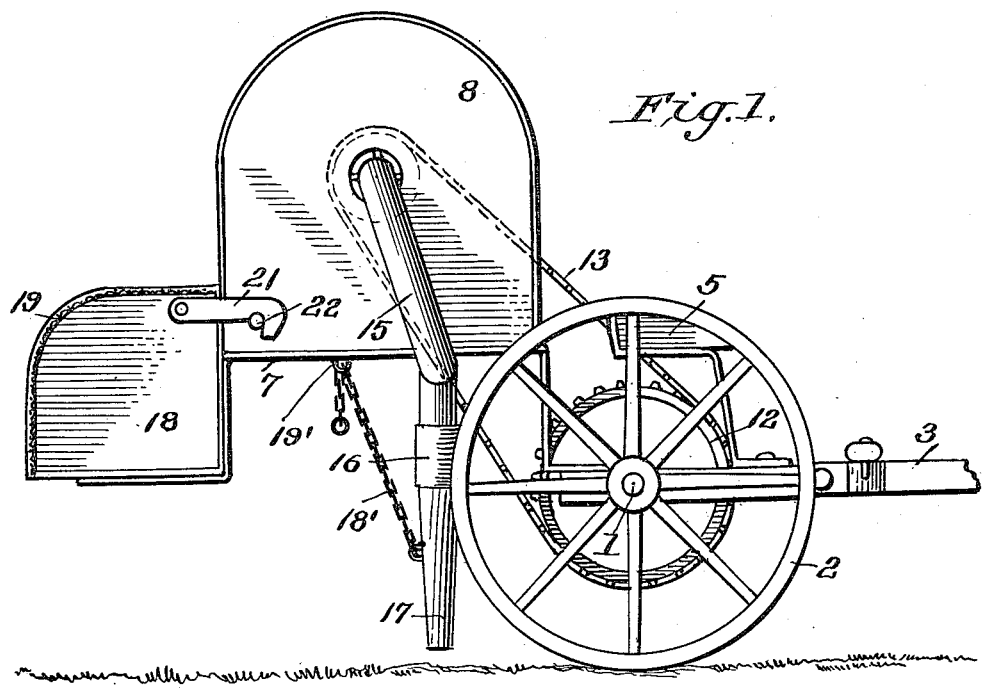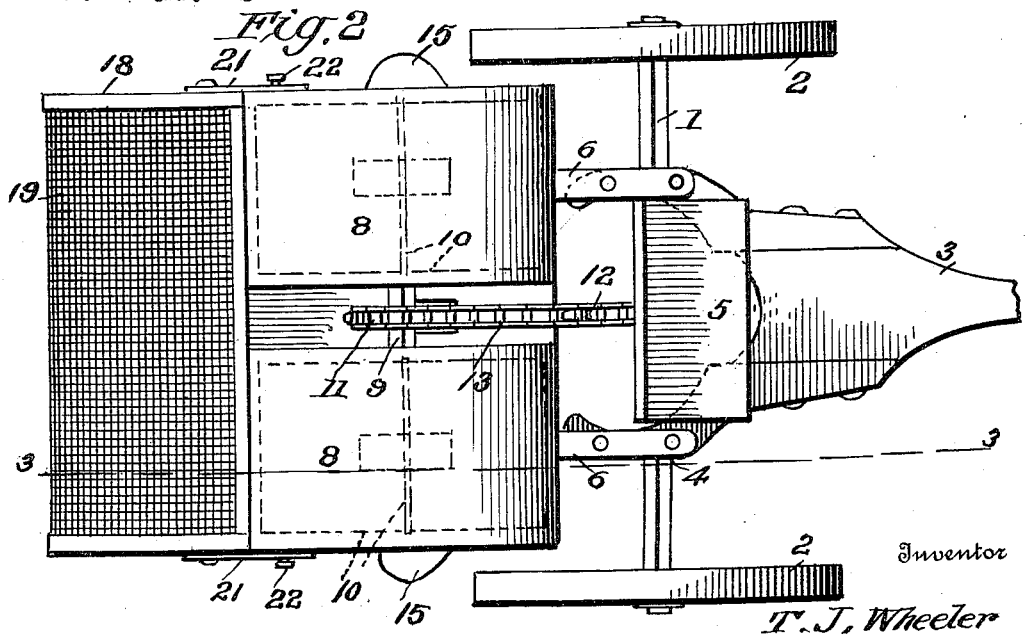

ary pupils. ascription ascent

UNITED STATES PATENT OFFICE.

THOMAS J. WHEELER, OF LEWISVILLE, ARKANSAS, ASSIGNOR OF ONE-HALF TO GEORGE M. McKNIGHT, OF LEWISVILLE, ARKANSAS.

MACHINE FOR GATHERING INSECTS.

1,016,861. Specification of Letters Patent. Patented Feb. 6, 1912.

Application filed June 29, 1911. Serial No. 636,124.

*To all whom it may concern:*

Be it known that I, THOMAS J. WHEELER, a citizen of the United States, residing at Lewisville, in the county of Lafayette and State of Arkansas, have invented certain new and useful Improvements in Machines for Gathering Insects, of which the following is a specification.

This invention has relation to pneumatic machines for gathering weevil and cotton squares infested with weevil larva and pupa and other plant destroying insects, and has for its object to provide, in a machine of the character indicated, a simple structure the operating parts of which are wheel mounted, the machine having gathering nozzles adapted to travel at the opposite sides of a row of standing plants.

The machine also includes a suction fan for each of the nozzles which have discharge outlets into a pound or cage carried by the machine. This pound is detachably mounted upon the machine and may be readily removed to accomplish the destruction of the gathered insects and material. The nozzles are provided with flexible sections whereby the said nozzles may operate close to the stalks of the plants but which may be brushed away from the plants should they come in contact with the same without injuring the said plants.

In the accompanying drawings:—Figure 1 is a side elevation of the machine; Fig. 2 is a top plan view of the same; Fig. 3 is a vertical longitudinal sectional view of the same cut on the line 3—3 of Fig. 2; Fig. 4 is a bottom plan view of the same; and Fig. 5 is a detail side elevation of a modified form of nozzle that may be used upon the machine.

Corresponding and like parts are referred to in the following description and indicated in all the views of the accompanying drawings by the same reference characters.

The machine consists of an axle 1 to the ends of which are fixed ground wheels 2. A tongue 3 is provided with bearings 4 in which the axle is journaled and an operator's seat 5 is mounted upon the rear end portion of the said tongue. Arms 6 extend rearwardly from the tongue 3 and are provided with intermediate arched portions 7. Fan casings 8 are mounted upon the intermediate arched portions 7 of the arms 6, and a shaft 9 is journaled in the sides of the said fan casings. Within each fan casing 8 the shaft 9 carries a set of fan blades 10. A pulley 11 is mounted upon the intermediate portion of the shaft 9 between the fan casings 8 and a pulley 12 is fixed to the intermediate portion of the axle 1. An endless belt 13 passes around the pulleys 11 and 12 and is adapted to transmit rotary movement from the axle 1 to the shaft 9. The casings 8 are provided at their rear sides and at their lower portions with discharge outlets 14. Intake pipes 15 are connected at their upper ends with the outer sides of the fan casings 8 and communicate with the interiors of the said casings. These pipes extend down along the outer sides of the said casings and then under the bottoms thereof and are downwardly disposed at their lower end portions and spaced one from the other. Flexible hose sections 16 are connected with the lower ends of the intake pipes 15 and metallic nozzles 17 are connected with the lower ends of the hose sections 15. The said nozzles 17 hang pendent and are flattened at their lower ends with their long dimensions transversely disposed to the line of draft of the machine. Chains 18′ are connected at their lower ends with the nozzles 17 and at their upper ends with hooks or eyes 19′ and may be used for drawing the nozzles together, whereby they may be made to operate close to the stalk of the standing plants. A pound 18 is detachably mounted upon the rear portion of the arms 6 with its forward side bearing against the rear sides of the arched portions 7 of the said arms. The upper and rear portions of the pound 18 are closed by a wire screen 19 and the said pound is provided at its upper forward portion with an opening 20 which is adapted to register with the discharge outlets 14 of the fan casings 8. Hooks 21 are pivoted at the ends of the pound 18 and are adapted to engage pins 22 located at the outer surfaces of the sides of the fan casings 8.

The machine is especially adapted to be used for gathering boll weevil and the squares of cotton plants containing the larva and pupæ of this insect, although it may be used to advantage for gathering potato bugs and similar insects. As is well known, as soon as the squares of a cotton plant become infested with the larva and pupæ of the boll weevil the said squares become loosened upon the plant and eventually fall to the ground. If these squares fall in places exposed to the sun for any length of time, the heat from the sun will eventually destroy the larva and pupæ, but if these squares fall on spots which are shaded by the foliage of the plants the larva and pupæ will live and will eventually develop into adult weevils. Therefore when the machine is used upon a stand of plants infested with the weevil, these squares are gathered from the ground under the foliage of the standing plants in a manner as will now be explained.

As the machine is drawn along a row of standing plants, the fan blades 10 are maintained in rotation by rotary movement transmitted from the axle 1 to the shaft 9, as has been explained. The blades create a suction draft through the intake pipes 15, hose 16 and nozzles 17, and the said blades create a force blast through the discharge outlet openings 14 of the fan casings. This blast may escape through the wire screen 19, but the particles of solid material carried by the blast will strike the said screen and will fall to the bottom of the pound 18. Therefore as the lower ends of the nozzles 17 pass over the weevil at the surface of the soil and the squares, the said weevil and squares are sucked up through the hose 16 and intake pipes 15 into the fan casings 8 and are discharged from the said casings by the action of the blades 10 through the outlets 14 into the pound 18. Inasmuch as the nozzles 17 are connected with the intake pipes 15 by the flexible hose sections 16 the said nozzles may operate close to the stalks of the plants and under the foliage of the plants and draw up the squares which lie in places protected from the sun by the foliage of the plants. Should the nozzles come in contact with the stalks of the plants they will not damage or injure the same, for the reason that the flexible hose sections 16 will permit the said nozzles to brush by the stalks. The flattened configuration of the nozzles 17 will also assist materially in enabling the nozzles to remove the material from the surface of the ground in close proximity of the stalks. At the same time the nozzles will retain their designed configuration even though they might occasionally come in contact with stone or other obstruction, for the reason that they are formed from sheet metal and for the further reason that the flexible hose sections 16 will permit the nozzles to sweep over the said obstructions. Under normal conditions the flexible hose sections 16 will hold the nozzles 17 approximately in vertical positions.

In the form of nozzle as shown in Fig. 5 the hose sections 16 are connected with branches 16' which in turn are connected with a single nozzle 17' having a V-shaped opening at its lower end. This nozzle may straddle a row of small plants which as the machine moves along the row will pass through the said V-shaped opening, whereby the one nozzle collects the weevil at the opposite sides of the row.

Having thus described the invention, what is claimed as new is:

A machine for gathering insects comprising a wheel mounted axle, side arms arched at their intermediate portions and mounted at their forward ends upon the axle, a pair of casings mounted upon the intermediate arched portions of the arms, a shaft journaled in the casings, fans fixed to the shaft and located in the casings, said casings having inlet openings and outlet openings, a pulley mounted upon the axle and operatively connected with the shaft at a point between the casings, intake pipes communicating with the interiors of the casings and located behind said pulley and at the opposite sides thereof, and a pound mounted upon the rear ends of the arms and communicating with the outlet openings of the casings.

In testimony whereof, I affix my signature in presence of two witnesses.

THOMAS J. WHEELER. [L. S.]

Witnesses:
 GEORGE W. DOBSON,
 CLARENDON W. MURKEY.